United States Patent
Farr et al.

(10) Patent No.: US 6,853,767 B1
(45) Date of Patent: Feb. 8, 2005

(54) METHODS FOR MANUFACTURING OPTICAL COUPLING ELEMENTS

(75) Inventors: Mina Farr, Palo Alto, CA (US); Jan Lipson, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 166 days.

(21) Appl. No.: 10/124,232

(22) Filed: Apr. 17, 2002

Related U.S. Application Data (60) Provisional application No. 60/358,052, filed on Feb. 19, 2002.

(51) Int. Cl.[7] .................................................. G02B 6/32
(52) U.S. Cl. .......................................... 385/33; 385/147
(58) Field of Search ........................ 385/11–16, 31–34, 385/37, 147

(56) References Cited

U.S. PATENT DOCUMENTS

| | | | |
|---|---|---|---|
| 6,118,910 A | * | 9/2000 | Chang .......................... 385/16 |
| 6,181,853 B1 | * | 1/2001 | Wade ........................... 385/37 |
| 2002/0131699 A1 | * | 9/2002 | Raguin et al. ................. 385/33 |
| 2003/0147578 A1 | * | 8/2003 | Pan et al. ...................... 385/11 |

* cited by examiner

Primary Examiner—Akm Enayet Ullah
(74) Attorney, Agent, or Firm—Workman Nydegger (57) ABSTRACT

Manufacturing coupling elements that have two or more ports. A focusing lens array is attached with a collimating lens array to form an element array such that each focusing lenslet is opposite a collimating lenslet. Optionally, an optical element such as a beam splitter is included between the focusing lens array and the collimating lens array. The individual coupling elements are then cut from the element array. After a row of coupling elements is cut or separated from the element array, a side of the exposed optical element can be polished and a third row of lenslets can be attached to the polished side of the optical element before the row is cut into individual coupling elements. This provides a third port to the coupling elements or optical transceivers.

24 Claims, 3 Drawing Sheets

FIG. 4B though this embodiment only describes three ports, it is appreciated that the present invention is not limited to coupling elements having only three ports.

METHODS FOR MANUFACTURING OPTICAL COUPLING ELEMENTS

RELATED APPLICATION

This application claims the benefit of U.S. Provisional Patent Application Ser. No. 60/358,052, entitled "Manufacturing Transceiver Optic Couplers," filed Feb. 19, 2002, which is incorporated herein by reference.

BACKGROUND OF THE INVENTION

1. The Field of the Invention

The present invention relates to manufacturing optical transceivers and coupling elements. More particularly, the present invention relates to systems and methods for manufacturing optical coupling elements in transceivers with multiple ports.

2. The Relevant Technology

Communication over optical fiber networks utilizes light signals that are effectively trapped inside of optical fibers. Because the light signals are trapped within a particular fiber, many fibers can be included in a single cable without concern about interference from the light signals carried by nearby fibers. Optical fibers also have the property of strongly rejecting interference that would otherwise be caused by radio frequencies and electromagnetic radiation. These characteristics make fiber optics ideally suited for many applications.

In order to transmit light signals using optical fibers, it is first necessary to introduce light into the fibers. Exemplary sources of light used in fiber optics are light emitting diodes and laser diodes. Coupling the light to a fiber, however, is not always efficient because the numerical aperture of the fiber is typically smaller than the common laser diode sources. Thus, coupling optics are needed for effective conversion of the laser diode mode to the transmitted optical mode inside the single mode optical fiber. Because coupling optics also have transmission losses and aberrations, only a portion of the light emitted by a light source that satisfies the physical characteristics of the transmitted fiber mode is effectively transmitted through the coupling optics and effectively coupled with the optical fiber. In addition, the power consumed by the light source is often increased in order to ensure that the light signal transmitted through the optical fiber has sufficient transmission power. To overcome these losses, the light sources are typically coupled or connected with optical fibers using high optical quality coupling elements with efficient anti-reflection coatings. This has the effect of reducing the power consumed by the light source while directing more light into the optical fiber. In addition to coupling a light source to an optic fiber, coupling elements are also used to couple or connect one optical fiber to another optical fiber and to couple or connect an optical fiber to a light detector.

Typical coupling elements or transceiver ports typically use ball lenses, aspheric lenses or graded index (GRIN) lenses. Ball lenses are significantly less expensive than aspheric lenses and GRIN lenses because they are simple to manufacture. However, the performance of GRIN lenses and aspheric lenses is significantly better than the performance of ball lenses.

A typical ball lens used to couple a laser diode output to a single mode fiber shows diffraction limited performance only in the 0.15 numerical aperture (A) region of the optical source. The same ball lens, when used to couple a single mode fiber to another single mode fiber can only couple light effectively up to 0.11 NA of the input fiber. Higher NA light output from the laser diode or the single mode fiber is highly aberrated and does not couple effectively when using coupling elements that include ball lenses.

GRIN lenses and aspheric lenses, on the other hand, perform significantly better than typical ball lenses. Laser diodes with beam divergence angles in the 0.5 NA region can effectively be coupled into single mode fibers using appropriate aspheric lenses. Unfortunately, the lowest cost aspheric glass lenses are significantly more expensive than ball lenses.

The advantage of using GRIN lenses or aspheric lenses over ball lenses is that a fiber optic system can generate sufficient transmission power with minimum laser output for any given link. In addition, low aberration imaging of the fiber output onto small detectors permits effective capture of the transmitted light when using GRIN lenses or aspheric lenses. The disadvantage of using GRIN lenses or aspheric lenses is their cost. Currently, low cost aspheric lenses are 10 to 20 times more expensive than ball lenses. What is needed are systems and methods of manufacturing low cost, high efficiency coupling elements or ports that provide improved optical performance.

BRIEF SUMMARY OF THE INVENTION

These and other problems are overcome by the present invention which relates to manufacturing coupling elements. The present invention more particularly relates to a method of making or manufacturing low cost coupling elements that perform better than simple ball lenses. One example of the coupling elements described herein is a low cost glass lens solution that has performance that is comparable to the performance of aspheric glass molded lenses.

The present invention utilizes lens arrays made out of glass, each having a plurality of lenslets. The glass lens arrays can be press molded such that the lenslets have spherical or aspherical surfaces with circular or square apertures. Each glass lens array is fire polished and the quality of the resulting lens surfaces is similar to the surface quality of conventional ground and polished single glass lenses or injection molded glass aspheric lenses.

To create an individual coupling element, a molded glass lens array is attached with another lens array to form an element array such that the lenslets of the respective arrays are opposite each other. Spacers may be included between the lens arrays to maintain a predetermined distance between the two lens arrays. The spacers may be molded as an integral part of one of the lens arrays.

The element array is cut or otherwise separated into rows and the rows are further separated or cut into individual coupling elements. Each individual coupling element thus includes a single lenslet from each of the original lens arrays. One of the lenslets acts as a collimating lens and functions to collimate light from a source or a fiber, for example. The other lenslet acts as a focusing lens to focus the collimated light on, for instance, a fiber or a detector.

In another embodiment of the present invention, a third optical layer is inserted between the two lens arrays. This third layer may be an array of prisms or other optical elements. The prisms allow each coupling element to also function as a beam splitter or an optical filter with specific wavelength or polarization characteristics. After the element array is cut into rows, one side of the exposed optical layer is polished and a third row of lenslets is attached to the polished area. Then, the row is cut or separated into individual coupling elements that have three ports.

The individual coupling elements manufactured or created in this manner have a cost that is less than the price of the low cost ball lens while offering performance similar to GRIN lenses or aspheric lenses.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

In fiber optics and optical communications, small lenses are often used to couple laser light into transmission fibers, connect one transmission fiber to another transmission fiber, and couple the output of the transmission fibers onto receiver detectors. The present invention relates to a method of manufacturing optical couplers or coupling elements for use in transceiver ports. The present invention utilizes molded lens arrays where the individual lenslets in each lens array can be used independently in separate coupling elements. The molded lens arrays have the advantage of being significantly less expensive than a single high quality aspheric lens or GRIN lens as previously described.

The higher quality lenslets or lenses from the lens arrays translate into improved coupling of a light source and a fiber from, for example, the basic ball lens coupling elements, because the molded elements of the lens array are molded in a general aspheric surface form. The present invention improves the coupling ratio and less output strength or power is required of the laser or light source to generate an adequate transmission signal in the optical fiber. In one embodiment, the lens arrays provide good thermal stability and optical transmission because the lens arrays are molded glass. It is understood that the present invention is not limited to glass molded lens arrays.

Figures 1A, 1B:
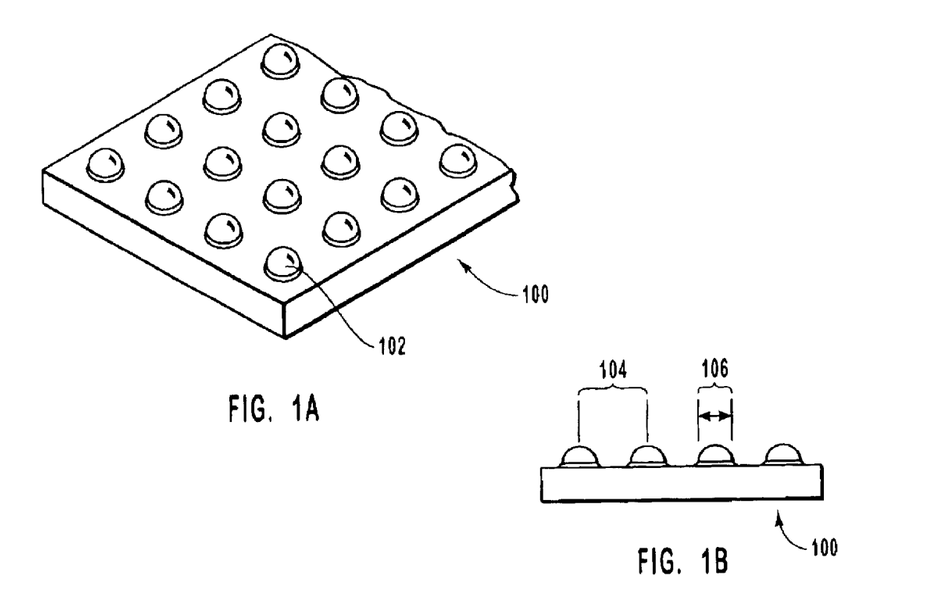
FIG. 1A illustrates a perspective view of a molded glass lens array that includes multiple lenslets.
FIG. 1B is a side view of the molded glass lens array of FIG. 1A and illustrates an example of the pitch and lens aperture associated with the lenslets of the lens array.

For illustrative purposes, FIGS. 1A–4B are not necessarily to scale and some features, such as lens surface curvature and the like are exaggerated for illustration purposes. FIG. 1A is a perspective illustration of a lens array 100 and FIG. 11B is a side view of the lens array illustrated in FIG. 1A. In this example, the lens array 100 is molded glass and the lens array 100 includes a plurality of lenslets which are exemplified by the lenslets 102. The lenslets of the lens array 100 can be press molded to have spherical or aspherical surfaces with either circular or square apertures, for example. The lens array 100 is often fire polished, which results in a surface quality and a finish that is comparable to conventional ground and polished single lenses.

In this example of the lens array 100, the lens aperture 106 is on the order of 2 millimeters and the pitch 104 is on the order of 3 millimeters. The lens array 100 has a thickness of approximately 2.5 millimeters to retain the stability of the molding process in arrays that have a width on the order of 50 to 75 millimeters. However, to accommodate a more compact transceiver port design, the molded lens array can be thinned to less than 1 mm in thickness by a simple polishing process performed on the flat side of the array before it is used. The number of lenslets 102 on a lens array 100 depends on the length and width of the lens array 100. An exemplary lens array 100 has a length and a width of 50 to 75 millimeters. It is understood that the parameters of pitch, lens aperture, length, and width are exemplary in nature and the present invention is not limited to these parameters and that these parameters can be adjusted according to specified optical requirements.

Figure 2:
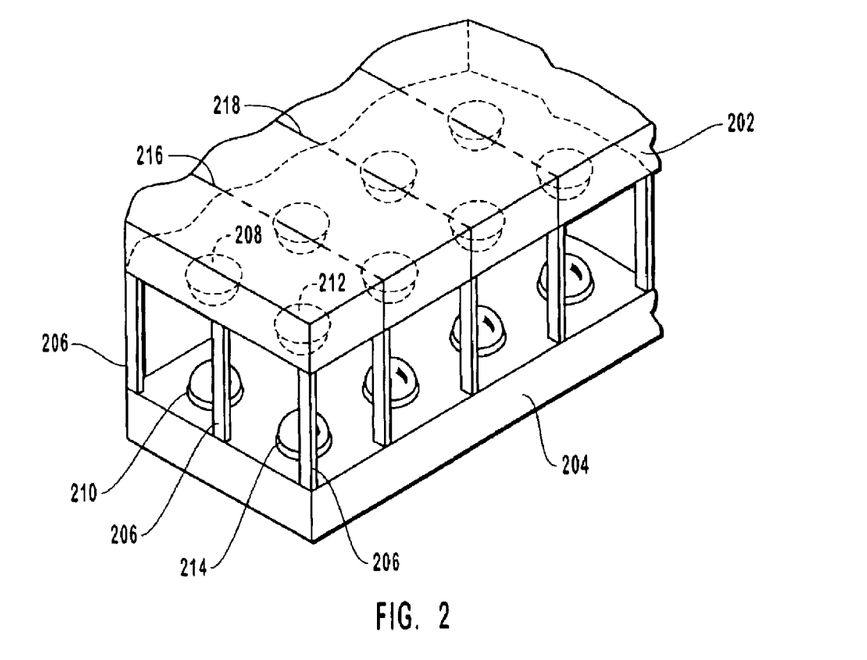
FIG. 2 is a perspective view of an element array that has been formed be attaching or connecting a pair of lens arrays such that the lenslets of the arrays are opposite each other.

FIG. 2 is a block diagram illustrating a pair of lens arrays that have been attached to form an element array of coupling elements. In FIG. 2, a collimating lens array 202 is connected with a focusing lens array 204. These matched collimating and focusing lens arrays are designed and molded with the same lenslet pitch but not necessarily using the same aperture size or shape. Each lenslet (lenslets 208 and 212, for example) of the collimating lens array 202 functions to collimate the light from a source while each lenslet (lenslets 210 and 214, for example) of the focusing array 204 are used to focus the light onto a destination such as a fiber or detector. Because of the size and shape of the collimating lens array 202 and the focusing array 204, spacers 206 are used to maintain the distance between the collimating lens array 202 and the focusing array 204. The spacers 206 can be molded as part of one of the arrays during the manufacturing process. The spacers 206 can also be formed or molded to establish a predetermined distance between the focusing lens array 204 and the collimating lens array 202. The dotted lines 216 and 218 indicate where the element array of FIG. 2 is cut or separated into rows of coupling elements.

Figure 3A:
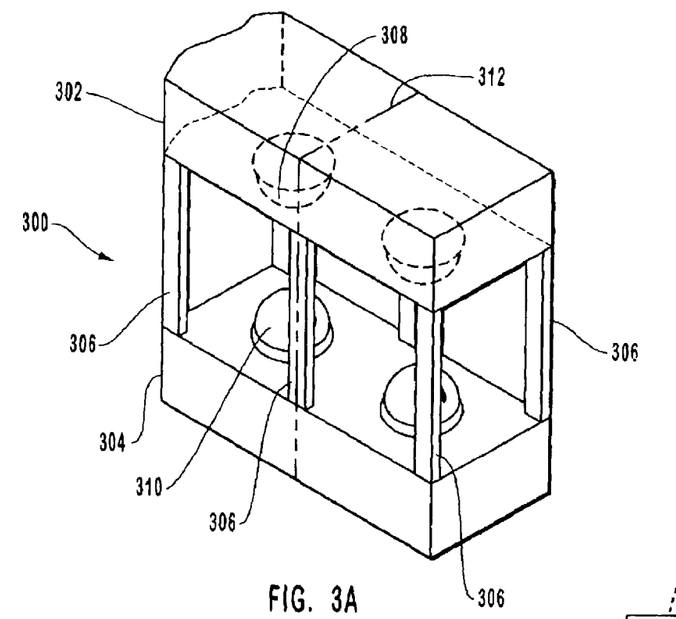
FIG. 3A is a perspective view of a row of the element array that has been separated or cut from the element array.

FIG. 3A is a perspective view of a single row of coupling elements that has been cut or separated from the coupling element array illustrated in FIG. 2. Dicing marks in convenient forms of lines, crosses, dots, or circles can be molded between the lenslets to ease the cutting process of individual ports. The row 300 includes a row 302 of the collimating lens array that is attached to a row 304 of the focusing array. Any number of attachment methods such as Ultra Violet curable epoxy or heat processed adhesives could be used to permanently attach the arrays. The row 300 of coupling elements further includes lenslets as described above where a collimating lenslet 308 is opposite a focusing lenslet 310. The dashed line 312 indicates where the row 300 is cut or separated in order to produce or separate the individual coupling elements from the row 300. The spacers 306, which connect the two rows of lenslets, are also illustrated.

Figure 3B:
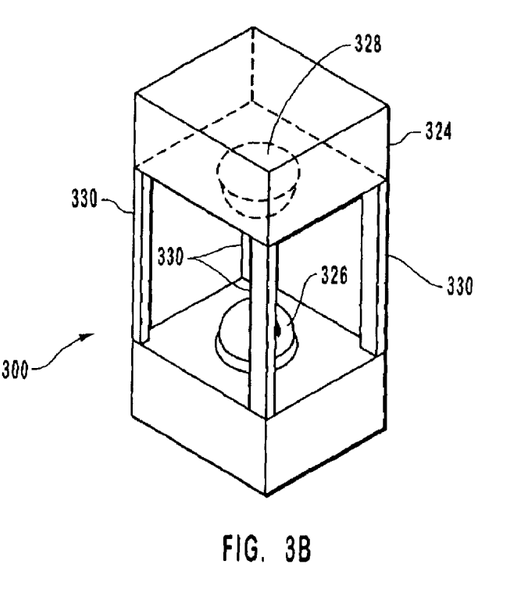
FIG. 3B is a perspective view of an individual coupling element that has been cut or separated from the row of FIG. 3A.

FIG. 3B is a perspective view of an individual coupling element that has, in this example, two ports. The coupling element 320 includes a collimating lenslet 328 and a focusing lenslet 326 that are opposite each other and are, typically, aligned due to the initial alignment of the each lenslet pair within the lenslet array. The collimating lenslet 328 and the focusing lenslet 326 have thus been separated from an array of coupling elements as described above and the coupling element 320 may be used, for example, to couple a laser diode output into a fiber, to couple the output of a fiber onto a detector, to couple one fiber to another, or as a single optical coupling module at this point. Each coupling element has spacers 330 to provide support and rigidity to the coupling element 300.

Figure 3C:
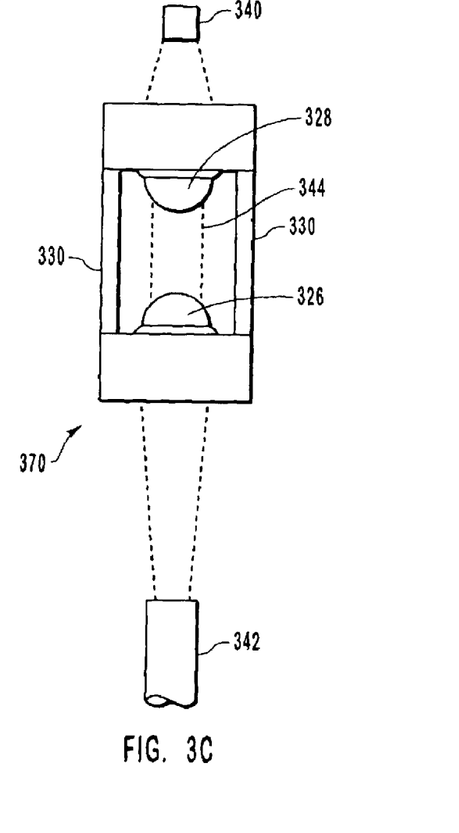
FIG. 3C is a side view of an individual coupling element and illustrates how the coupling element can couple a light source with a fiber.

FIG. 3C is a side view of the coupling element 300 of FIG. 3B and illustrates an example of how a coupling element may be utilized in optical communication. A laser diode 340 produces laser light than needs to be focused or introduced into a fiber 342. The laser diode 340 is typically placed a distance $f_1$ from the collimating lenslet 328, where $f_1$ is the focal length of the collimating lenslet 328. The purpose of the collimating lenslet 328 is to collimate the light output of the laser diode 340 or other light source in part because the collimated beam between the collimating lenslet 328 and focusing lenslet 326 can be used by other optical components to perform other functions on the beam. These functions can be performed using optical components that include, but are not limited to, wavelength filters, attenuators, wave plates, isolators, and the like or any combination thereof.

The collimated light 344 is incident upon the focusing lenslet 326, which focuses the collimated light 344 upon the fiber 342. The fiber 342 is located a distance $f_2$ from the focusing lenslet 326, where $f_2$ is the focal length of the focusing lenslet 326. The focusing lenslet 326 is typically designed to account for the numerical aperture of the fiber 342. The focal length $f_2$ of the focusing lenslet 326 over the focal length $f_1$ of the collimating lenslet 328 determines the magnifications of the coupling optics. The magnification of the coupling element 300 is designed as the ratio of the NA of the input to the coupling element 300, which may be a laser diode in this example, to the NA of the output of the coupling element 300, which is often a fiber, for efficient coupling.

In this manner, individual coupling elements are produced by attaching a pair of lens arrays and then separating or cutting the attached arrays into individual coupling elements. One advantage of maintaining a space between the lenslet arrays is that the collimated light can be used for other optical elements without change in the optical performance of the coupling element. The collimation space between the collimating lenslet and the focusing lenslet, occupied by the spacer elements or by other extra optical elements can be different in each case without a need to change the collimator and focusing lens design. Thus optical components can be inserted in the design between the two lenses and the spacer length can be varied without affecting the coupling performance of the coupling optics.

Another advantage is the automatic pre-alignment of the collimating and focusing lenses in the array form. Once the alignment of the two lens arrays is done, there is no need for further adjustment of the elements within the port.

The alignment between the opposing lenslets (the collimating lenslet 328 and the focusing lenslet 326) of the coupling element 320 is also not critical because the light between the opposing lenslets is collimated. Extreme misalignments, however, may cause the collimated light to be vignetted by the lens apertures. Arranging two opposing lens arrays as described and cutting the lens arrays into individual coupling elements generate two-port optical devices that can be used for a variety of purposes including, but not limited to, coupling laser light into a fiber, coupling the output of one optical fiber to another optical fiber, and coupling the output of an optical fiber to a detector.

Figure 4A:
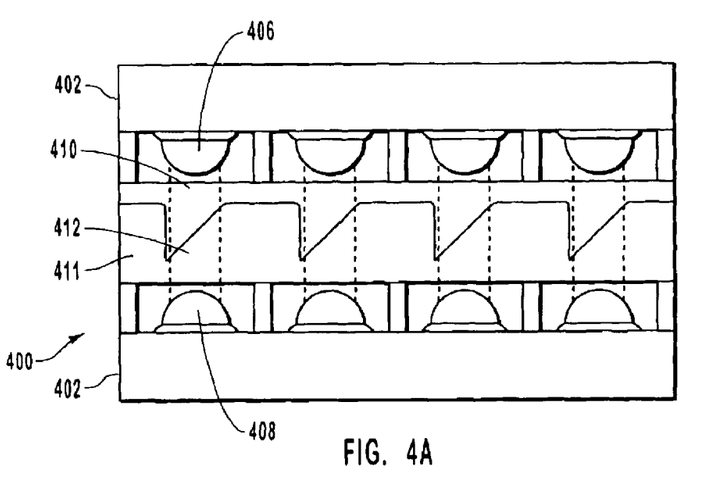
FIG. 4A is a side view of an element array that includes an array of prisms that have been inserted between the lens arrays.
Figure 4B:
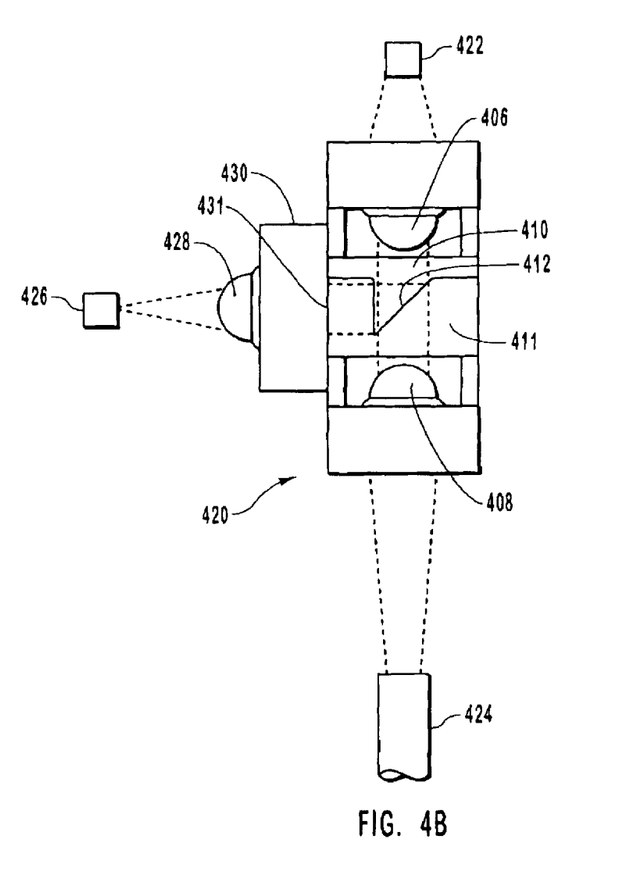
FIG. 4B is a side view of an individual coupling element that utilizes the array of prisms by providing a third port on the coupling element.

As previously mentioned, having a space between the opposing arrays or lenslets in the coupling element permits other optical elements to be inserted between the collimating lens array and the focusing lens array. These optical elements can perform, for example, isolation, attenuation, and the like. FIGS. 4A and 4B illustrate an example where an array of prisms is inserted between the collimating lens array and the focusing lens array.

FIG. 4A is a side view of an element array that includes an optical element between the lens arrays. In this example, a pair of prism arrays (prism array 410 and prism array 411) have been inserted between the collimating lens array 402 and the focusing lens array 404. The prism arrays function as a beam splitter for the collimated light that passes through the coupling elements. The interface 412 between the prism array 410 and the prism array 411 can be appropriately coated as known in the art before the prism arrays are attached or connected and inserted between the collimating lens array 402 and the focusing lens array 404. The interface 412 is positioned, for example, at 45 degrees.

The element array of FIG. 4A is then separated or cut into rows as previously described. When the rows are separated, each side of the optical element is exposed. In the example where the optical element is a prism array, then a side of the prism is exposed. In other words, a prism surface is exposed. The prism side is polished. After the prism side is polished, another lenslet row 430, as illustrated in FIG. 4B, is attached to the polished surface 431 of the prism 410. The pitch of the lenslet row 430 is made out to be the same as the collimator and focusing lenslet arrays. The row of coupling elements 400 is now prepared to be cut or separated into individual three port coupling elements. Each three port coupling element is pre-aligned in the array form as previously described and the collimated beam advantages in alignment tolerance are also true for the third port of the coupling elements manufactured in this manner.

The interface 412 shown in FIG. 4B acts as a beam splitter for the light collimated by the collimating lenslet 406. In this example, a source 422 emits light that is collimated by the collimating lenslet 406. The focusing lenslet 408 receives some of the collimated light and focuses the light on a fiber 424 or a detector as previously described. The detecting lenslet 428 which receives light that is redirected or split at the interface 412 focuses the light on a destination such as a detector 426, for example. Alternatively the beam splitter can detect light that is received from another fiber instead of a light source. The beam splitter can also direct an optical signal to another fiber.

The beam splitter or prism arrays described above are usually created from molded glass. In another example, the beam splitter that is inserted between the collimating lens array and the focusing lens array can be created using plastic molded parts that are similar to the glass prism arrays. Exemplary plastics have good transmission characteristics for certain wavelengths. The plastic array is not required to have high surface quality as the beam splitter surface. Instead, a glass bar that has been coated to enable beam splitting is positioned on the interface surfaces of the plastic prism arrays. After the glass bars have been properly positioned, the plastic arrays are filled and attached using optical epoxy. The optical epoxy ensures, for example, that the glass bars are securely fixed within the element array of coupling elements and that the optical element within each coupling element will function properly. For example, the interface 412 may instead represent a glass bar that is securely fixed using optical epoxy.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for manufacturing an optic coupling element for use in fiber networks, the method comprising:
    attaching a collimating lens array with a focusing lens array to produce an element array, wherein each lenslet of the collimating lens array is opposite a lenslet of the focusing lens array;
    separating the element array into one or more rows, wherein each row includes a row of the collimating lens array and a row of the focusing lens array; and
    cutting a row into individual coupling elements.

2. A method as defined in claim 1, further comprising:
    molding the collimating lens array; and
    molding the focusing lens array.

3. A method as defined in claim 2, further comprising:
    fire polishing the collimating lens array; and
    fire polishing the focusing lens array.

4. A method as defined in claim 2, further comprising molding spacers as an integral part of either the focusing lens array or the collimating lens array, wherein the spacers have a length that established a distance between the focusing lens array and the collimating lens array.

5. A method as defined in claim 1, further comprising inserting an optical element between the collimating lens array and the focusing lens array before attaching the collimating lens array with the focusing lens array.

6. A method as defined in claim 5, further comprising inserting at least one prism array between the collimating lens array and the focusing lens array.

7. A method as defined in claim 5, wherein separating the element array into one or more rows, wherein each row includes a row of the collimating lens array and a row of the focusing long array further comprises:
    polishing an exposed side of the optical element; and
    attaching another row of lenslets to the polished side of the optical element, wherein the optical element is a beam splitter.

8. A method of manufacturing a three port coupling element for use in fiber optic networks, the method comprising:
    attaching a focusing lens array to an optical element;
    attaching a collimating lens array the optical element to form an element array, wherein the optical element is between the focusing lens array and the collimating lens array and wherein lenslets of the focusing lens array are opposite lenslets of the collimating lens array;
    cutting the element array into rows, wherein at least one side of the optical element is exposed;
    attaching a detector lens array to the exposed side of the optical element; and
    separating the row into individual coupling elements, wherein each coupling element has a focusing lenslet, a collimating lenslet and a detector lenslet.

9. A method as defined in claim 8, further comprising:
    molding the focusing lens array from glass; and
    molding the collimating lens array from glass.

10. A method as defined in claim 9, further comprising:
    polishing the focusing lens array, and
    polishing the collimating lens array.

11. A method as defined in claim 9, further comprising:
    molding spacers as an integral part of the focusing lens array; and
    molding spacers as an integral part of the collimating lens array.

12. A method as defined in claim 8, wherein attaching a focusing lens array to an optical element further comprises attaching the focusing lens array to at least one array of prisms.

13. A method as defined in claim 8, wherein attaching a detector lens array to the exposed side of the optical element further comprises polishing the exposed side of the optical element before attaching the detector lens array to the exposed side.

14. A method as defined in claim 8, further comprising applying an optical coating to the optical element.

15. A method as defined in claim 8, further comprising filling the element array with optical epoxy such that the optical element is securely positioned within the element array.

16. A method for manufacturing optical transceivers having multiple ports, the method comprising:
    molding a focusing lens array that has one or more focusing lenslets;
    molding a collimating lens array that has one or more collimating lenslets;
    connecting the focusing leas array with the collimating lens array to form an element array such that each focusing lenslet is opposite a collimating lenslet, wherein each pair of opposing lenslets are included in each optical transceiver;
    cutting the element array into one or more rows of optical transceivers; and
    cutting a row of optical transceivers into individual optical transceivers, wherein each optical transceiver includes at least a focusing lenslet and a collimating lenslet, wherein the collimating lenslet is able to collimate light from a light source and wherein the focusing lenslet is able to focus the collimated light on a destination.

17. A method as defined in claim 16, wherein molding a focusing lens array that has one or more focusing lenslets further comprises molding spacers as an integral part of the focusing lens array.

18. A method as defined in claim 16, wherein molding a collimating lens array that has one or more collimating lenslets further comprises molding spacers as an integral part of the collimating lens array.

19. A method as defined in claim 16, wherein the focusing lens array is molded from glass, molding the focusing lens array such that the each lenslet has one or more of:

a spherical surface;

an aspherical surface;

a square aperture; and a circular aperture.

20. A method as defined in claim 16, wherein the collimating lens array is molded from glass, molding the collimating lens array such that the each lenslet has one or more of:

a spherical surface;

an aspherical surface;

a square aperture; and a circular aperture.

21. A method as defined in claim 16, further comprising:

polishing the focusing lens array; and polishing the collimating lens array.

22. A method as defined in claim 16, further comprising:

inserting an optical element between the collimating lens array and the focusing lens army, wherein the optical element is secured using optical epoxy.

23. A method as defined in claim 22, wherein the optical element is at least one array of prisms.

24. A method as defined in claim 22, wherein cutting the element array into one or more rows of optical transceivers further comprises:

polishing the optical element between the collimating lenslets and the focusing lenslets of the row; and attaching another row of new lenslets to the polished optical element such that each new lenslet forms a third port on each optical transceiver.

* * * * *

UNITED STATES PATENT AND TRADEMARK OFFICE
CERTIFICATE OF CORRECTION

| | | |
|---|---|---|
| PATENT NO. | : 6,853,767 B1 | Page 1 of 1 |
| APPLICATION NO. | : 10/124232 | |
| DATED | : February 8, 2005 | |
| INVENTOR(S) | : Farr et al. | |

It is certified that error appears in the above-identified patent and that said Letters Patent is hereby corrected as shown below:

Drawings
Sheet 2, replace Figure 3B with the figure depicted herein below, in which the "coupling element" labeled "300" has been relabeled with --320-- .

FIG. 3B

Signed and Sealed this

Eleventh Day of September, 2007

JON W. DUDAS
*Director of the United States Patent and Trademark Office*

UNITED STATES PATENT AND TRADEMARK OFFICE
CERTIFICATE OF CORRECTION

PATENT NO.        : 6,853,767 B1
APPLICATION NO.   : 10/124232
DATED             : February 8, 2005
INVENTOR(S)       : Farr et al.

It is certified that error appears in the above-identified patent and that said Letters Patent is hereby corrected as shown below:

Drawings
Sheet 2, replace Figure 3B with the figure depicted herein below, in which the "coupling element" labeled "300" has been relabeled with --320-- .

FIG. 3B

UNITED STATES PATENT AND TRADEMARK OFFICE
CERTIFICATE OF CORRECTION

PATENT NO.         : 6,853,767 B1
APPLICATION NO. : 10/124232
DATED              : February 8, 2005
INVENTOR(S)        : Farr et al.

It is certified that error appears in the above-identified patent and that said Letters Patent is hereby corrected as shown below:

Drawings
Sheet 3, replace Figure 4A with the figure depicted herein below, in which the "focusing lens array" labeled with "402" has been relabeled with --404-- .

FIG. 4A

Column 1
Line 65, change "(A)" to --(NA)--

Column 3
Line 35, before "attaching" change "be" to --by--

Column 4
Line 15, change "11B" to --1B--

UNITED STATES PATENT AND TRADEMARK OFFICE
CERTIFICATE OF CORRECTION

PATENT NO. : 6,853,767 B1
APPLICATION NO. : 10/124232
DATED : February 8, 2005
INVENTOR(S) : Farr et al.

It is certified that error appears in the above-identified patent and that said Letters Patent is hereby corrected as shown below:

Column 5
Line 25, after "element" change "300" to --320--
Line 26, after "element" change "300" to --320--
Line 51, after "element" change "300" to --320--
Line 52, after "element" change "300" to --320--
Line 54, after "element" change "300" to --320--

Column 8
Line 2, after "lens array" insert --to--
Line 50, change "leas" to --lens--

Column 10
Line 6, change "army" to --array--

This certificate supersedes the Certificate of Correction issued September 11, 2007.

Signed and Sealed this

Twenty-ninth Day of July, 2008

JON W. DUDAS
*Director of the United States Patent and Trademark Office*